May 20, 1958     H. C. MOSES ET AL     2,835,857

LIMITED OUTPUT RANGE SERVOSYSTEM

Filed May 29, 1953

INVENTORS
HARRY C. MOSES
ROBERT S. RAVEN

BY
ATTORNEYS

United States Patent Office 2,835,857
Patented May 20, 1958

2,835,857

LIMITED OUTPUT RANGE SERVOSYSTEM

Harry C. Moses, Baltimore, and Robert S. Raven, Catonsville, Md., assignors, by mesne assignments, to the United States of America as represented by the Secretary of the Navy Application May 29, 1953, Serial No. 358,366

7 Claims. (Cl. 318—30)

The present invention relates to an electrical stopping system for restricting or limiting the output shaft movement of a servomechanism within predetermined angular limits.

Briefly stated, the system consists of a clipper circuit for limiting the servo error signal, a control box associated with the output shaft of the servomechanism and including a spring-centered potentiometer and a limit switch, a tachometer, and circuits for adding the potentiometer and tachometer voltages into the servo system. The spring centered potentiometer within the control box is connected to the output shaft of the system by means of a suitable device which moves the potentiometer wiper arm as the output enters the stopping region. No wiper arm movement is produced when the output shaft of the system is within the predetermined following region. Thus, when the output shaft enters the stopping region, a voltage is produced between the wiper arm and the center tap of the potentiometer. This voltage has been utilized in the present invention to nullify the servo error signal so as to stop the movement of the output shaft of the system at predetermined angular positions. The tachometer has been utilized to prevent the shaft from overshooting the predetermined stopping position. As the output shaft enters the stopping region, the switch in the control box, which is coupled to the shaft by appropriate means, is closed, thereby connecting the output of the tachometer, which is driven by the output shaft, to a feedback circuit. The voltage produced by the fedeback circuit is supplied to the system to slow the angular output of the output shaft as it enters a stopping region.

It is, therefore, an object of this invention to provide a device for stopping the output shaft of a servo system at predetermined angular limits of travel.

It is a further object of this invention to provide a system which will limit the movement of the output shaft of a servo system between predetermined limits and which will introduce no inaccuracies into the system in areas between the said limits.

It is a still further object of this invention to provide a system for positively limiting rotation of the output shaft of a servo system between predetermined limits of angular rotation which will prevent overshooting of the shaft beyond said limits.

Another object of the present invention is to provide means to prevent hunting in a system for stopping the output shaft of a servo system between predetermined angular limits.

For a more complete understanding of the present invention, reference should now be made to the drawing in which.

Figures 3, 4:
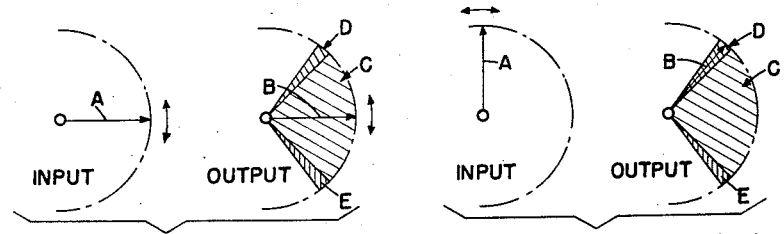
Fig. 3 is a graphic representation of the relative positions of the input shaft and the output shaft of the servo system of the present invention when operated within the following region.
Fig. 4 is a graphic representation of the relative positions of the input shaft and the output shaft of the servo system of the present invention when operated within the stopping region.

For a better understanding of the invention, reference should first be made to Figs. 3 and 4 which are graphic representations of the operation of this system. In these figures, the arrows A represent the input to the servo system, while the arrows B represent the output. C denotes the region in which the output will closely follow the input, as in the usual servomechanism. The region C will hereinafter be referred to as the accurate following region. The areas D and E represent the limits of travel of the output and will be hereinafter referred to as the stopping region. As shown in Fig. 3, while the input A to the servo system is such that the output B is in the accurate following region, the output closely follows the input. If, however, as shown in Fig. 4, the input A is such that the output B would follow outside the area C, then the output will automatically be stopped in the area D (as shown) or E. The circuit to be described will keep the output of a servo system within the accurate following region or will maintain the output stationary within the stopping regions. Furthermore, as the input A moves back into a following region the system is so designed that the output B will follow back into the accurate following region. The system to be described also provides against overshooting, and it introduces no inaccuracies within the following region.

Figure 1:
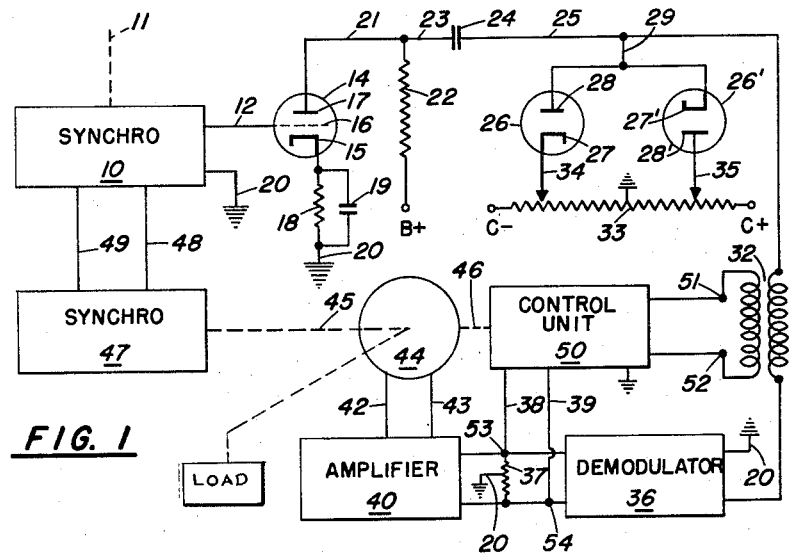
Fig. 1 is a diagrammatic representation of a simplified embodiment of the invention.

Referring now to Fig. 1 of the drawing, 10 denotes an input synchro device having an input shaft 11. The rotational position of the shaft 11 corresponds to the position of the arrw A as illustrated in Figs. 3 and 4. The system also includes a follow up synchro device 47 which is electrically connected to the input synchro device 10 by means of leads 48 and 49. The follow up synchro device is driven by the output shaft 45. The rotational position of the shaft 45 corresponds to the position of the arrow B as illustrated in Figs. 3 and 4. The signal output of the synchro device 10, grounded at 20, is applied through lead 12 to the grid 16 of a conventional triode amplifier 14, having a plate 17 and a cathode 15. The amplifier 14 may be biased by means of a parallel resistor 18 and condenser 19 connected to ground at 20. The plate supply is applied at B+ through resistor 22 and plate lead 21. The output of the amplifier 14 is applied through line 23, condenser 24, and leads 25 and 29 to a clipping circuit. The clipping circuit comprises a pair of diodes 26 and 26' connected in parallel circuit relations. The plate 28 of diode 26 is connected with the cathode 27', and the plate 28' of diode 26' is connected to the cathode 27 of diode 26 through the biasing resistor 33. The biasing voltage is applied at C+ and C— across resistor 33 in a conventional manner.

The output of the clipping diodes 26 and 26' is applied through the secondary of the transformer 32 and grounded point 20 to a conventional demodulator 36 to obtain a balanced D. C. signal. The output of the demodulator 36 is amplified by means of a conventional amplifier 40 which supplies the motor 44 by way of leads 42 and 43. The motor 44 is the work motor and may be used to rotate a gun mount, radar antenna or other useful load.

A shaft 45 couples the motor to the follow up synchro device 47 in the usual manner, in order to produce a follow up signal.

Figures 2, 5:
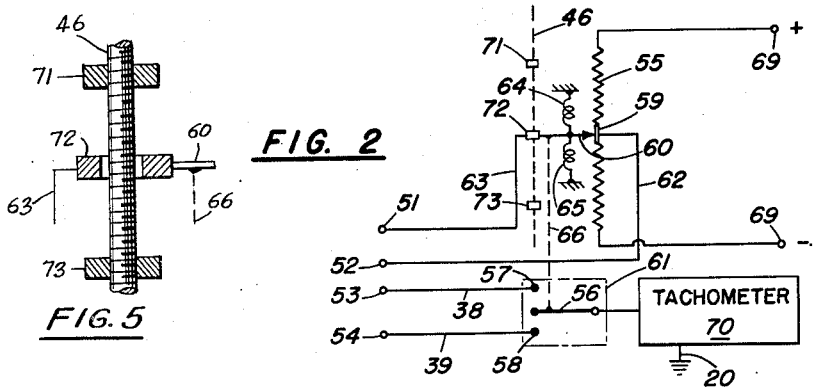
Fig. 2 is a diagrammatic representation of the stopping control device utilized in the invention.
Fig. 5 is a detail view of the threaded shaft and control elements connected to the load motor.

As thus far described, the system described will produce a rotational output of the motor 44 which will coincide with the input of the shaft 11. In many instances, however, it is desirable that certain predetermined limits of rotation of the motor 44 be maintained. A threaded shaft 46 has been provided for producing two signals which will maintain these limits. The shaft 46 has been connected to the control unit 50. As seen in Fig. 1, the control unit 50 produces two outputs. A first output, employed as a stopping signal, is applied at the terminals 51, 52, across the primary of the transformer 32. A second output, employed to prevent overshooting, or hunting, is applied across the terminals 53, 54 of the center grounded resistor 37. The method by which these outputs from the control box are obtained will now be explained with particular reference to Fig. 2 of the drawing.

The control unit 50 comprises a spring centered potentiometer 55, a limit switch 61 and a tachometer 70 coupled to the shaft 46. The potentiometer is provided with a small land 59 at its center. The potentiometer 55 is center tapped by a connection of the lead 62 to the land 59. A wiper or slider arm 60 is spring centered by means of the springs 64 and 65 so that during operation of the system in the following region, the wiper arm remains stationary on the land 59. The wiper arm is loosely coupled to the shaft 46 by means of a movable collar 72, and is electrically connected to the terminal 51 through lead 63. Limit nuts 71 and 73 are positioned on the threaded shaft 46 to provide two predetermined limits for the system. Thus, as the threaded shaft 46 rotates, the limit nuts will travel along the shaft. When either nut 71 or 73 reaches the loosely coupled collar 72, movement of the collar will result, thus producing movement of the wiper arm 60 and an output voltage from the potentiometer 55, which is energized, as shown, at terminals 69.

The contact 56 of the limit switch 61 is coupled to the collar 72 through shaft 66. Therefore, upon movement of the collar 72 in one direction a circuit from the tachometer 70 will be completed through the contact 56, the contact 57, lead 38, terminal 53, a portion of resistor 37 and ground 20. Upon movement of the collar 72 in an opposite direction, a circuit will be completed from the tachometer 70 through contacts 56 and 58, lead 39, terminal 54 and the other portion of resistor 37 to ground 20. While the system is operating within the following region, the contact 56 will remain in the position shown and no output from the tachometer will be produced.

In operation, the gain of the system is adjusted so that only a small predetermined misalignment of the input shaft 11 and the output shaft 46 will produce maximum output velocity. Thus, the operation of the system is not affected when the amplified error voltage is clipped by the diodes 26 and 26' at a value corresponding to the value of the predetermined angular error. The use of the clipping diodes 26 and 26' in this manner makes it possible to use a small potentiometer excitation for the potentiometer 55 in the control unit 50. If the error voltage is not clipped, the stopping voltage from the potentiometer 55 would have to balance out an error voltage corresponding to as much as a 30 degree angular error. Since the stopping voltage must be developed by only a few degrees of movement of the shaft 46 within the stopping region D or E, the excitation voltage of the potentiometer would have to be very large. This would be the equivalent of raising the gain of the system by a very large factor within the stopping region and it would result in instability. When the error voltage is clipped, however, the maximum stopping voltage need not be much greater than the value to which the signal is clipped.

Thus when the output shaft 46, which is attempting to follow the input shaft 11, enters the stopping region, the wiper arm 60 is moved from the land 59 and a stopping or nullifying voltage output is developed across the terminals 51 and 52. This output is fed back to the demodulator 36 and amplifier 40 in opposition to the input error signal to thereby stop the motor 44 within the stopping region.

To prevent the output shaft 46 from overshooting beyond the stopping region when it enters this region at full speed, a feed back voltage from the tachometer 70 mounted on the shaft 46 is introduced into the system across a portion of the resistor 37. The switch 61 in the control unit 50 admits the voltage of the tachometer 70 into the servo circuit only when the shaft 46 enters one of the stopping regions. The effect of the tachometer voltage on the performance of the system is to decelerate the motor 44 and act as a brake. Thus, as the output shaft 46 enters a stopping region, the tachometer feed back voltage applied through resistor 37 tends to slow the output shaft 46 and prevents it from overshooting the stopping region. In addition, the tachometer 60 tends to stabilize the servo system when it is operating within the stopping regions.

Thus, there has been provided a servo follow up system which includes a system for automatically stopping the output of a servo within predetermined limits without introducing inaccuracies in the following region and which prevents hunting at the stopping region.

What is claimed is:

1. Apparatus for limiting the angular output movement of a servomotor to predetermined limits comprising an input shaft, an input synchro device connected thereto, an output shaft, a servomotor connected to said output shaft for angular movement thereon, an output synchro device connected to said servomotor, feed back connections from said output synchro device to said input synchro device, circuit connections from said input synchro device to said servomotor for producing a lag error signal voltage therein, and control means for nullifying the servomotor error signal voltage and stopping the servomotor at predetermined limits of angular output movement of said servomotor.

2. The apparatus as defined in claim 1, said control means comprising a potentiometer for supplying a lag error nullifying voltage to the servo-system, and means connected to said shaft output for developing a corrective voltage in said potentiometer at the predetermined servomotor movement limits only.

3. The apparatus as defined in claim 2, said potentiometer voltage developing means including a linear resistor, a slider normally at zero contact on said resistor but movable to voltage points thereon, and mechanical means for shifting said slider at set limits of output shaft lag.

4. The apparatus as defined in claim 2, said control means including additionally speed variable apparatus for accelerating the lag error voltage nullification at the set limits of servomotor movement.

5. The apparatus as defined in claim 4, the speed of voltage nullification of said speed variable apparatus being variable directly with the output shaft speed.

6. The apparatus as defined in claim 2, said slider having resilient means for holding it adjacent zero contact on said resistor and for returning it to said contact after displacement therefrom, and said resistor zero contact being in the form of land having linear dimensions including the rest range of said slider.

7. The apparatus as defined in claim 2, said circuit connection between said input synchro device and servomotor including a clipper circuit for limiting the lag error voltage.

References Cited in the file of this patent

UNITED STATES PATENTS

| 1,945,392 | Borden | Jan. 30, 1934 |
| 2,489,689 | Wald | Nov. 29, 1949 |
| 2,492,745 | Hammes | Dec. 27, 1949 |
| 2,654,999 | Berge | Oct. 13, 1953 |